United States Patent [19]

Tani

[11] Patent Number: 5,623,464
[45] Date of Patent: Apr. 22, 1997

[54] OPTICAL DISK APPARATUS AND SEEK CONTROL METHOD

[75] Inventor: Hiroshi Tani, Kawasaki, Japan

[73] Assignee: Fujitsu Limited, Kawasaki, Japan

[21] Appl. No.: 535,994

[22] Filed: Sep. 29, 1995

Related U.S. Application Data

[63] Continuation-in-part of Ser. No. 480,077, Jun. 7, 1995, abandoned.

[30] Foreign Application Priority Data

Sep. 29, 1994 [JP] Japan .................. 6-234971
Sep. 11, 1995 [JP] Japan .................. 7-232440

[51] Int. Cl.$^6$ .................................... G11B 7/085
[52] U.S. Cl. ........................... 369/44.28; 369/32
[58] Field of Search ................. 369/44.28, 44.29, 369/44.34, 32; 360/78.05, 78.06, 78.07, 78.08

[56] References Cited

U.S. PATENT DOCUMENTS

| | | | |
|---|---|---|---|
| 4,745,587 | 5/1988 | Maeda et al. ................. | 369/44.28 |
| 5,077,716 | 12/1991 | Takeda et al. ................. | 369/32 |
| 5,121,370 | 6/1992 | Yanagi ......................... | 369/44.28 |
| 5,182,736 | 1/1993 | Yanagi ......................... | 369/44.28 |
| 5,241,522 | 8/1993 | Yanagi ......................... | 369/44.28 |

Primary Examiner—W. R. Young
Assistant Examiner—Thang V. Tran
Attorney, Agent, or Firm—Greer, Burns & Crain, Ltd

[57] ABSTRACT

An acceleration α that is peculiar to a lens actuator is obtained by an acceleration measuring section on the basis of a moving speed when a 1-track jump such that a light beam spot of an optical head is moved to an adjacent track is executed to the lens actuator. A seek control section moves the light beam spot of the optical head to a target track by an acceleration control and a constant speed control of the lens actuator. When the light beam spot reaches a position that is located by a predetermined number of tracks before the target track, the lens actuator is deceleration controlled on the basis of the acceleration measured by the acceleration measurement and the light beam spot is on-tracked to the target track at the end time point of the deceleration control.

28 Claims, 14 Drawing Sheets

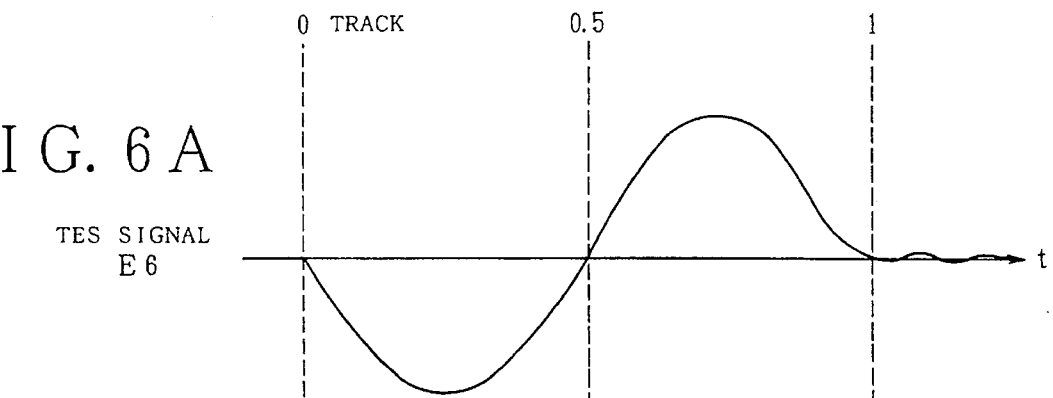
FIG. 6A
TES SIGNAL
E6
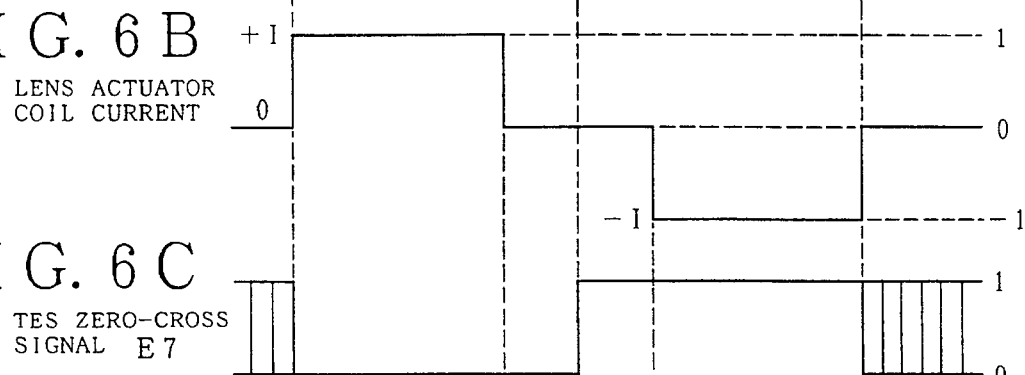
FIG. 6B
LENS ACTUATOR
COIL CURRENT
FIG. 6C
TES ZERO-CROSS
SIGNAL E7
FIG. 6D
TRACKING SERVO
ON SIGNAL E8
FIG. 6E
LENS ACTUATOR
SPEED
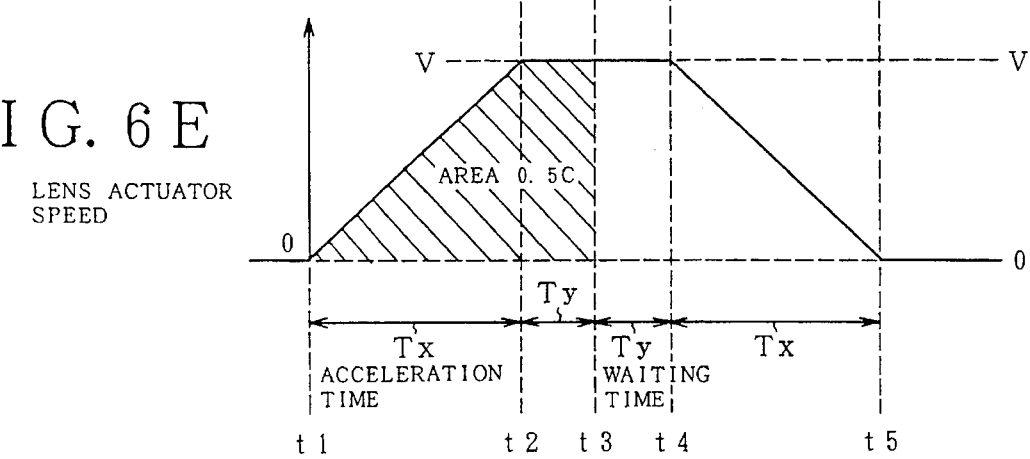

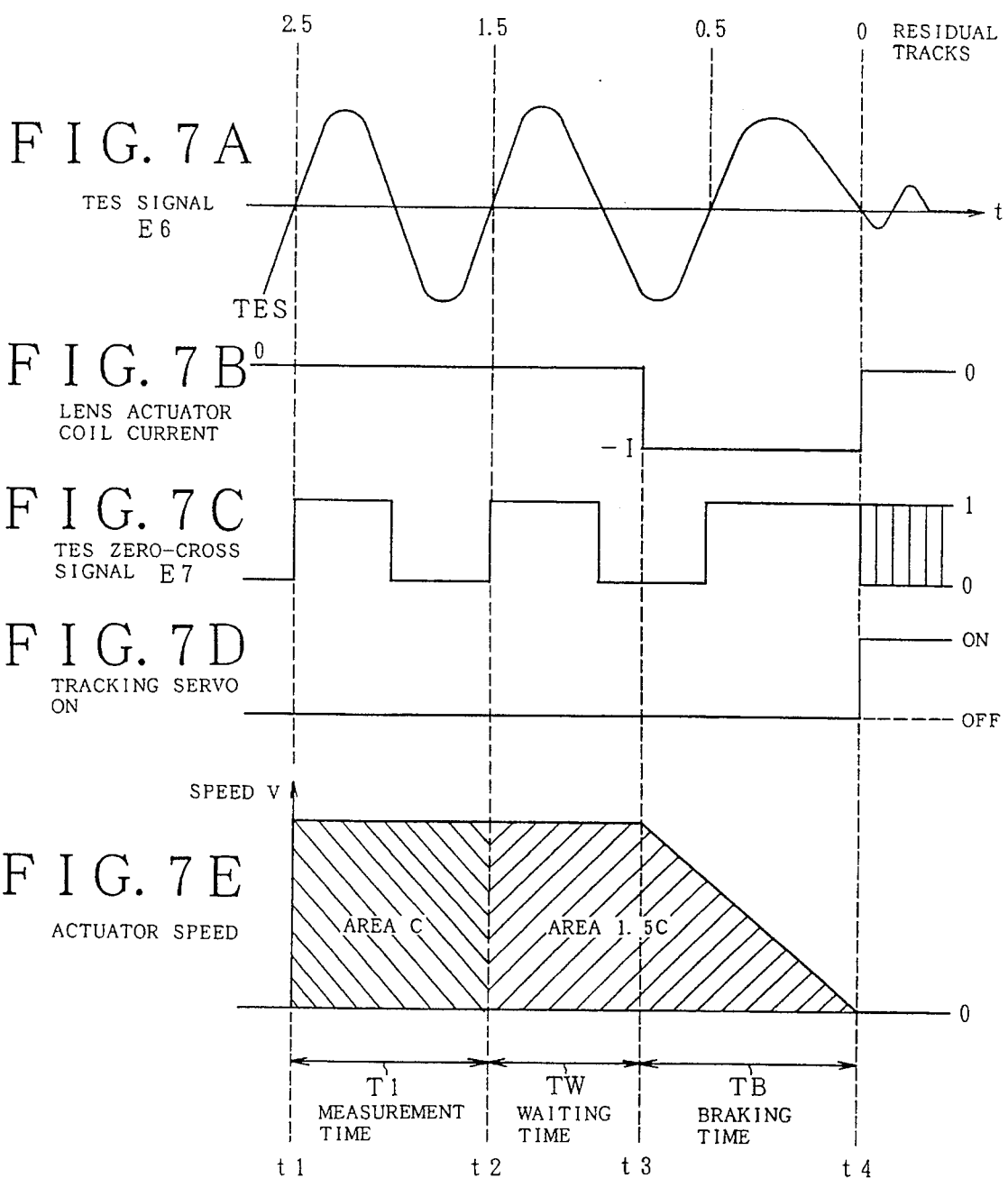

OPTICAL DISK APPARATUS AND SEEK CONTROL METHOD

This application is a continuation-in-part of U.S. application Ser. No. 08/480,077, filed on Jun. 7, 1995 now abandoned.

BACKGROUND OF THE INVENTION

The present invention relates to an optical disk apparatus for moving a light beam spot irradiated from an optical head to a target track of a disk medium surface by a seek control and, more particularly, to an optical disk apparatus and its seek control method in which a deceleration control when the optical head approaches a target track is optimized.

Hitherto, according to an optical disk apparatus, an optical head is mounted on a carriage that is moved in the radial direction of a disk medium by a voice coil motor. The optical head converges a laser beam by an objective lens and forms a micro beam spot onto the medium surface. The objective lens is driven by a lens actuator and moves the beam spot in the disk radial direction. A range in which the beam spot can be moved by a lens actuator is so narrow to be, for example, 32 tracks on one side. A movement of the beam spot exceeding 32 tracks is executed by the carriage.

When a seek command is received from an upper apparatus, the optical disk apparatus executes a seek control for moving the beam spot of the optical head to a track address received as a command parameter. The seek control is mainly divided into a coarse control to mainly move the carriage, a fine control to mainly move the lens actuator, and a deceleration control to set the speed to zero at a target track. As for those controls and switching operation, when the number of remaining tracks (difference) for the target track exceeds, for example, 32 tracks, the coarse control is executed and, when the number of remaining tracks is equal to or less than 32 tracks, the fine control is executed. In a state in which the on-track control of the lens actuator is released, the coarse control and fine control execute the speed control based on a predetermined target speed table. During the speed control, the number of tracks over which the head has passed is known from a zero-cross detection signal of the tracking error signal and the number of remaining tracks up to the target track is monitored. When the number of remaining tracks reaches a specified value, the deceleration control is performed. At the end time point of the deceleration control, ideally, the beam spot of the optical head reaches the target track and the speed is zero.

When the deceleration control is finished, a control mode of the lens actuator is switched to a position control of the target track and a servo pull-in to pull in the beam spot to the target track is performed. In the deceleration control, so long as a deceleration and an acceleration of the lens actuator has already been known, a deceleration start position in front of the target track is obtained and an ideal deceleration control can be performed.

In such a seek control of the conventional optical disk apparatus, an acceleration of the lens actuator is determined at the stage of the design, a predetermined acceleration is set commonly for all of the apparatuses, and the deceleration control is executed. In the actual apparatus, however, the lens actuator of the optical head has an acceleration that is peculiar to the apparatus due to an acceleration performance peculiar to the lens actuator, a coil current, an eccentricity of the medium, a difference of an assembly state, a fluctuation of dimensions (obviously, within a permission precision), or the like although such an acceleration lies within a range of the acceleration performance which is required at the design stage. Therefore, in the fixedly decided acceleration, the acceleration performance peculiar to the apparatus is not considered. There are problems such that when there is a large fluctuation, the deceleration control is insufficient or, contrarily, the deceleration control is excessively executed and the pull-in to the target track fails and the seek performance deteriorates due to a retry in association with a seek error.

SUMMARY OF THE INVENTION

According to the invention, an optical disk apparatus and a seek control method in which the optimum deceleration control can be performed in consideration of an acceleration performance that is peculiar to the apparatus are provided.

According to an optical disk apparatus of the invention, an optical head (optical pickup) is mounted on a carriage which is moved in the radial direction of a disk medium. According to the optical head, a light beam spot is formed on a medium surface of the disk medium by an objective lens, thereby optically reading and writing information. The objective lens is driven by a lens actuator (tracking actuator) and moves the light beam spot in the radial direction of the disk.

With respect to such an optical disk apparatus, the invention is characterized by having an acceleration measuring section for obtaining an acceleration α that is peculiar to the lens actuator on the basis of a moving speed when the lens actuator is acceleration controlled.

A seek control section moves the light beam spot of the optical head to a target track by a predetermined speed control and a constant speed control of the lens actuator. When the light beam spot reaches a position which is located by a predetermined number of tracks before the target track, the lens actuator is deceleration controlled on the basis of the acceleration measured by an acceleration measuring section and the light beam spot is on-tracked to the target track at the end time point of the deceleration control.

The acceleration measuring section of the invention obtains an acceleration α that is peculiar to the lens actuator by executing a track jump for moving the light beam spot from the optical head to the adjacent track. In the track jump, after the on-track control of the lens actuator was cancelled, the acceleration control is executed for only a predetermined time Tx, the control mode is switched to the constant speed control, and a waiting time Ty until the light beam spot reaches the 0.5 tracking position after the end of the acceleration is measured. Further, after waiting for the same time as the waiting time Ty from the 0.5 tracking position, the deceleration is executed for the same predetermined time as the acceleration time Tx and the control mode is switched to the on-track control.

The acceleration α that is peculiar to the lens actuator is calculated by the following equation on the basis of the measurement waiting time Ty assuming that a track pitch is equal to (C) and an acceleration time is equal to Tx.

$$\alpha = \frac{C}{Tx^2 + 2 \cdot Tx \cdot Ty}$$

The acceleration measuring section measures an acceleration a plurality of number of times and obtains the peculiar acceleration from the average of the measurement results. For example, the acceleration measurement is performed a plurality of number of times in a predetermined track on the inner side of the disk medium. The acceleration measurement is executed a plurality of number of times in a predetermined track on the outer side. The peculiar acceleration α is obtained from the average of the plurality of measurement results. The acceleration measuring section executes the acceleration measurement of the lens actuator at a turn-back position of a track eccentricity in the radial direction of the disk medium. Specifically speaking, the optical head uses a lens position sensor to detect a position of an objective lens which is driven by the lens actuator. In a state in which the light beam spot of the optical head is traced to the track eccentricity in the radial direction of the disk medium by an on-track control of the lens actuator, the acceleration measuring section monitors a lens position signal from the lens position sensor and measures an acceleration of the lens actuator at a position at which an increasing/decreasing direction of the lens position signal changes. Such an operation is equivalent to that the lens position signal from the lens position sensor is differentiated and the acceleration measurement of the lens actuator is executed at a position at which a differentiation signal is set to 0. Further, when a disk medium is inserted to the apparatus, the acceleration measuring section executes the acceleration measurement of the lens actuator. The acceleration measuring section executes the acceleration measurement of the lens actuator in a waiting state of a command from an upper apparatus. Further, the acceleration measuring section performs the acceleration measurement of the lens actuator when a seek error occurs, and updates an acceleration which is used for a deceleration control of a next seek retry operation.

When the light beam spot reaches a position which is located by a predetermined number of tracks before a target track that is decided by an acceleration performance of the lens actuator, a seek control section measures a track passing time (T) and obtains a moving speed (V) and, subsequently, obtains a deceleration time TB up to the target track by using the moving speed (V) and measurement acceleration α. Finally, the seek control section obtains a waiting time TW until the start of the deceleration from a time point of the end of the measurement of the track passing time by the measurement time (T) and deceleration time TB and deceleration controls the lens actuator 25 for a period of time of the deceleration time TB from the elapse of the waiting time TW. Now, assuming that a passing time of one track is equal to (T) and a deceleration time is equal to TB, the waiting time TW is calculated by $$TW=(3T-TB)/2$$

The invention also provides a seek control method of the optical disk apparatus. The seek control method is executed by the following procedure.

I. Acceleration measuring step:

The acceleration α that is peculiar to the lens actuator is obtained on the basis of the moving speed when accelerating the lens actuator for moving the light beam spot on the disk medium surface in the radial direction of the disk by driving the objective lens of the optical head mounted on the carriage which is moved in the radial direction of the disk medium.

II. Seeking step:

The light beam spot of the optical head is moved to the target track by a predetermined speed control and constant speed control of the lens actuator and when the light beam spot reaches a position which is located by a predetermined number of tracks before the target track, the lens actuator is deceleration controlled on the basis of the measurement acceleration α and the light beam spot is on-tracked to the target track at the end of the deceleration control.

The other processing steps are fundamentally the same as the construction of the apparatus.

According to the optical disk apparatus and seek control method of the invention as mentioned above, the acceleration performance of the lens actuator is previously measured and the resultant acceleration is used for the deceleration control at the time of pull-in of the tracking servo. Consequently, even if the acceleration performance has a variation that is peculiar to the apparatus, the ideal deceleration control such that the speed is set to 0 when the light beam spot reaches the target track position can be performed. The pull-in to the target track can be certainly executed. Since no seek error occurs, a seek performance is remarkably improved.

The above and other objects, features, and advantages of the present invention will become more apparent from the following detailed description with reference to the drawings.

BRIEF DESCRIPTION OF THE DRAWINGS

FIGS. 6A to 6E are timing charts for an acceleration measurement according to the invention;

FIGS. 7A to 7E are timing charts for a deceleration control according to the invention;

DETAILED DESCRIPTION OF THE PREFERRED EMBODIMENT

Figure 1:
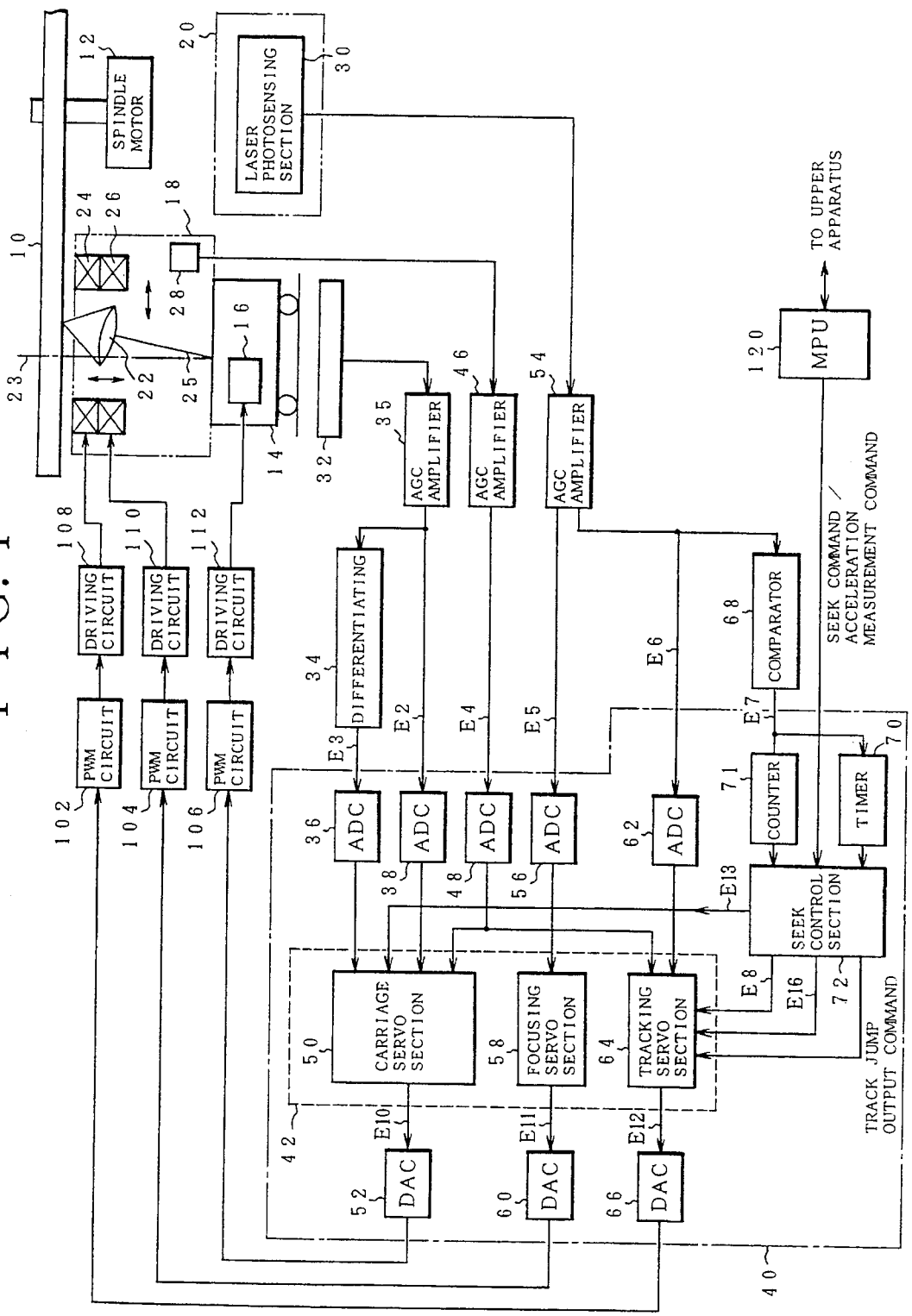
FIG. 1 is a block diagram of an embodiment of the invention.

In FIG. 1, an optical disk 10 is a medium to/from which information can be optically written and read out. The optical disk 10 is enclosed in a cartridge (not shown). When the cartridge of the optical disk 10 is inserted into an apparatus, it is loaded to a rotary axis of a spindle motor 12 by a loading mechanism as shown in the diagram. The spindle motor 12 rotates the optical disk 10 at a constant speed. A carriage 14 is arranged so as to be movable in a radial direction for the optical disk 10. An optical head movable section 18 is mounted to the carriage 14. The carriage 14 is moved in the radial direction of the optical disk 10 by a carriage driving coil 16. Specifically speaking, a voice coil motor is used. An objective lens 22 is provided for the optical head movable section 18 mounted on the carriage 14. The objective lens 22 converges a laser beam irradiated by an optical head fixing section 20 onto a medium surface of the optical disk 10, thereby forming a beam spot. The objective lens 22 is driven by a lens actuator 25 having a tracking actuator driving coil 24 and moves the beam spot in the radial direction of the optical disk 10. The lens actuator 25 is also called a tracking actuator. A moving range of the beam spot by the objective lens 22 is set to a range of one side, for example, 32 tracks for a lens center 23. The objective lens 22 is moved in the direction of an optical axis by a focusing actuator driving coil 26 and executes a focusing control to form a specified beam spot onto the medium surface of the optical disk 10. Further, a lens position sensor 28 is provided for the optical head movable section 18. The lens position sensor 28 detects the position of the objective lens 22. Namely, when the objective lens 22 is located at the lens center position 23, a lens position signal E4 that is obtained from an AGC amplifier 46 is set to 0 V. When the objective lens 22 moves toward the inner side, for example, a signal voltage having a plus polarity and according to a movement amount is derived. When the objective lens 22 moves to the outer side, a signal voltage having an opposite minus polarity and according to a movement amount is obtained. The position of the carriage 14 is detected by a carriage position sensor 32. A carriage position signal E2 of the carriage position sensor 32 which is outputted from an AGC amplifier 35 is set to 0 when the carriage 14 is located to the innermost position. The carriage position signal E2 is set to a signal voltage which is proportionally increased in accordance with the movement of the carriage 14 toward the outer side.

A laser photosensing section 30 to receive a return light of the beam spot formed on the optical disk 10 by the objective lens 22 is provided for the optical head fixing section 20. A light reception signal of the laser photo sensing section 30 is supplied to an AGC amplifier 54. A focusing error signal E5 and a tracking error signal E6 are outputted from the AGC amplifier 54. A laser light source to emit a laser beam to the optical head movable section 18 is provided for the optical head fixing section 20. The details of the optical head fixing section 20 will be clearly explained hereinlater. A DSP (digital signal processor) 40 is provided to perform a servo control of the carriage 14, lens actuator driving coil 24, and focusing actuator driving coil 26. The DSP 40 has therein an A/D converter and a D/A converter and, for example, an MB86311 made by Fujitsu Ltd. can be used. Each circuit function of a carriage servo section 50, a focusing servo section 58, a tracking servo section 64, and a seek control section 72 is realized by a processor circuit section 42 of the DSP 40. Further, an MPU (microprocessing unit) 120 is also provided and notifies a seek command to the DSP 40 on the basis of a command from an external disk control unit. The MPU 120 also instructs to start an acceleration measurement of the invention.

The carriage servo section 50 executes a position lock control and a double servo control by using the carriage 14. For those controls, the carriage position signal E2 based on the detection signal of the carriage position sensor 32 is outputted from the AGC amplifier 35 and is supplied to the carriage servo section 50 via an A/D converter 38. By differentiating the carriage position signal E2 from the AGC amplifier 35 by a differentiating circuit 34, a carriage speed signal E3 is formed and is supplied to the carriage servo section 50 via an A/D converter 36.

The seek control by the seek control section 72 is mainly divided into a coarse control to mainly move the carriage 14, a fine control to mainly move the lens actuator 25, and a deceleration control to set the speed to zero at a target track.

The coarse and fine controls are feedback controls such that a TES zero-cross signal E7 which is outputted from a comparator 68 is counted by a counter 71 for a predetermined time, the speed is compared with a target speed by a seek control section 72, and current instruction data E10 is outputted to a D/A converter 52 so as to set a deviation between those speeds to zero. In the coarse control, the carriage 14 is speed controlled and the lens actuator 25 is controlled so as to always set the position signal E4 from the lens position sensor 28 to zero. Such an operation is called a lens lock. Specifically speaking, a lens lock-on signal E16 is outputted from the seek control section 72 to the tracking servo section 64. The fine control is executed when the number of tracks up to the target cylinder is equal to or less than 32 tracks on each of the inner side and the outer side. At this time, the carriage servo section 50 executes the position servo control. Therefore, for the motion of the lens actuator 25, the carriage servo section 50 performs the position control for allowing the carriage 14 to trace so as to always set the position signal E4 from the lens position sensor 28 to zero. Such an operation is called a double servo.

The tracking servo section 64 executes an on-track control and a seek current output by the driving of the lens actuator driving coil 24.

The tracking error signal E6 based on the light reception output of the laser photosensing section 30 is supplied from the AGC amplifier 54 to the tracking servo section 64 through an A/D converter 62. The tracking error signal E6 is supplied to the comparator 68, from which the TES zero-cross signal E7 indicative of a zero-cross timing of the tracking error signal is outputted. The zero-cross signal E7 is given to the counter 71. Each time the head passes one track, one zero-cross signal E7 is obtained. Therefore, the number of passing tracks in the seek control can be recognized by the seek control section 72.

A generation period of time of the zero-cross signal E7 which is outputted from the comparator 68 is measured by a timer 70, so that the passing time of one track can be recognized by the seek control section 72. When the 1-track passing time is obtained from the timer 70, the seek control section 72 can recognize a moving speed of the beam spot at that time, namely, a moving speed of the beam spot by the objective lens 22 driven by the lens actuator driving coil 24. Further, a seek command to instruct a target track address (target address) is notified from an upper apparatus to the seek control section 72. The seek control section 72 which received the seek command obtains the number of remaining tracks to the target track address for the present track address recognized on the basis of the zero-cross signal E7. When the number of remaining tracks is equal to or less than 32, the fine control mainly based on the lens actuator is executed. When it is larger than 32, the coarse control mainly based on the carriage is performed.

Simultaneously with the instruction of a track jump current output, the seek control section 72 stops an output of a track servo ON signal E8 and turns off an on-track control by the tracking servo section 64. For a period of time during which the track servo ON signal E8 is received from the seek control section 72, the tracking servo section 64 outputs an instruction data signal E12 to a D/A converter 66 so as to always set the tracking error signal E6 from the A/D converter 62 to 0 and executes the on-track control by the driving of the lens actuator 25 by the lens actuator driving coil 24. Upon seeking, since the tracking servo ON signal E8 is stopped, the on-track control is cancelled. At the same time, a seeking operation based on a seek current output instruction of the track jump current output that is generated is executed. In a manner similar to the case mainly based on the carriage, the seek control mainly based on the lens actuator is also constructed by a coarse control comprising the acceleration control, constant speed control, and deceleration control and a fine control. In the invention, the seek control section 72 has a function as an acceleration measuring section for measuring an acceleration of the lens actuator 25 by the lens actuator driving coil 24 provided for the optical head movable section 18.

Figure 2:
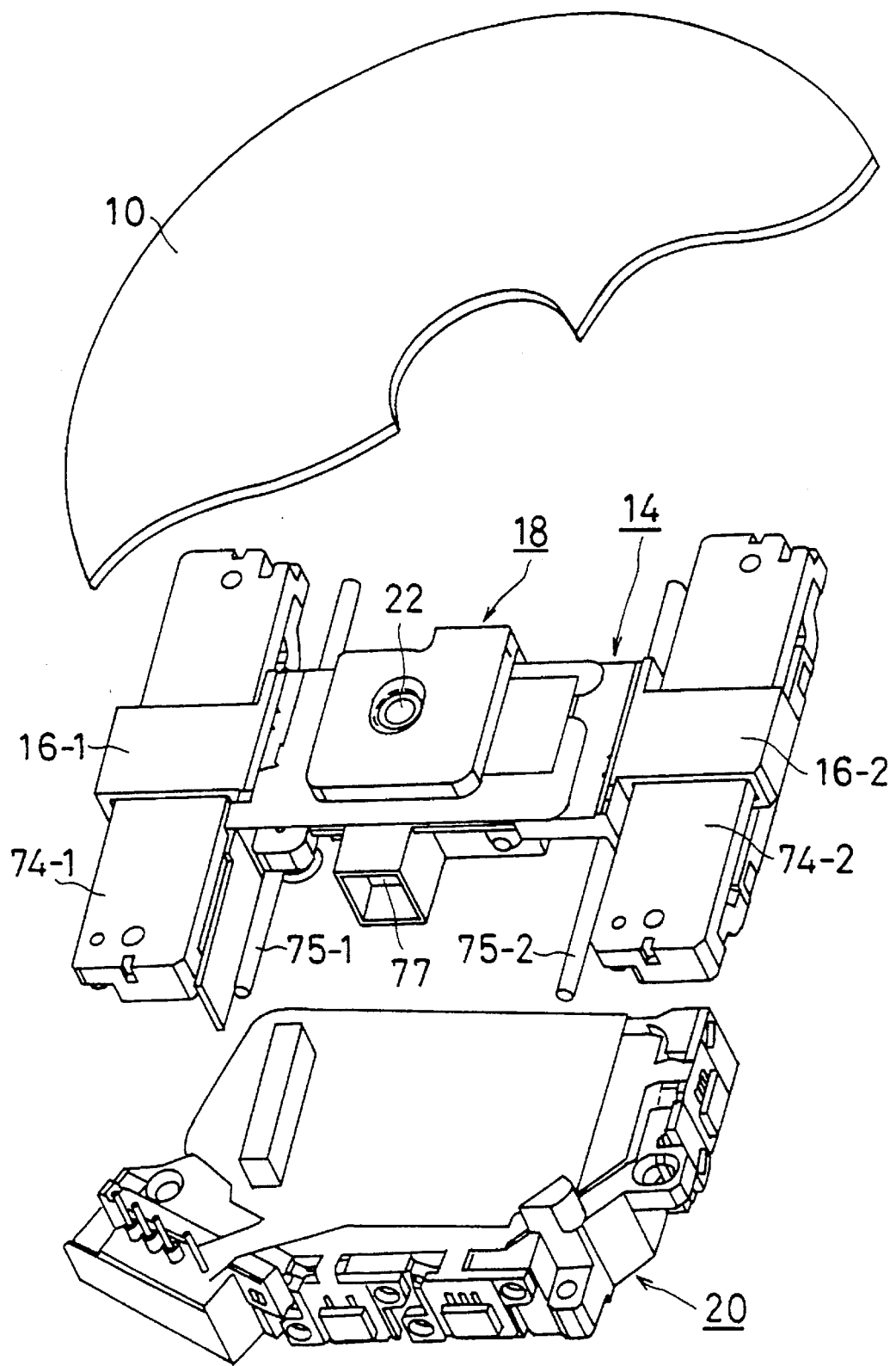
FIG. 2 is an assembly exploded diagram of a carriage and an optical head.

FIG. 2 shows a specific example of the carriage 14, optical head movable section 18, and optical head fixing section 20 of the invention. The optical head fixing section 20 is fixed to a frame of the apparatus (not shown). The carriage 14 which is movable along guide rails 75-1 and 75-2 is provided in front of the optical head fixing section 20. Box-shaped carriage driving coils 16-1 and 16-2 which are opened to the front and rear sides are provided on both sides of the carriage 14. The carriage driving coils 16-1 and 16-2 are inserted around a pair of magnet units 74-1 and 74-2 fixed to the frame of the apparatus. A voice coil motor (VCM) is formed by the carriage driving coils 16-1 and 16-2 and magnet units 74-1 and 74-2. The optical head movable section 18 having the objective lens 22 is mounted on the carriage 14. The optical head movable section 18 has a beam input/emission port 77 and inputs and emits a laser beam to/from the optical head fixing section 20. The optical head movable section 18 mounted on the carriage 14 moves the beam spot in the radial direction of the medium surface on the lower side of the optical disk 10 showing the objective lens 22 with a part cut away.

Figure 3:
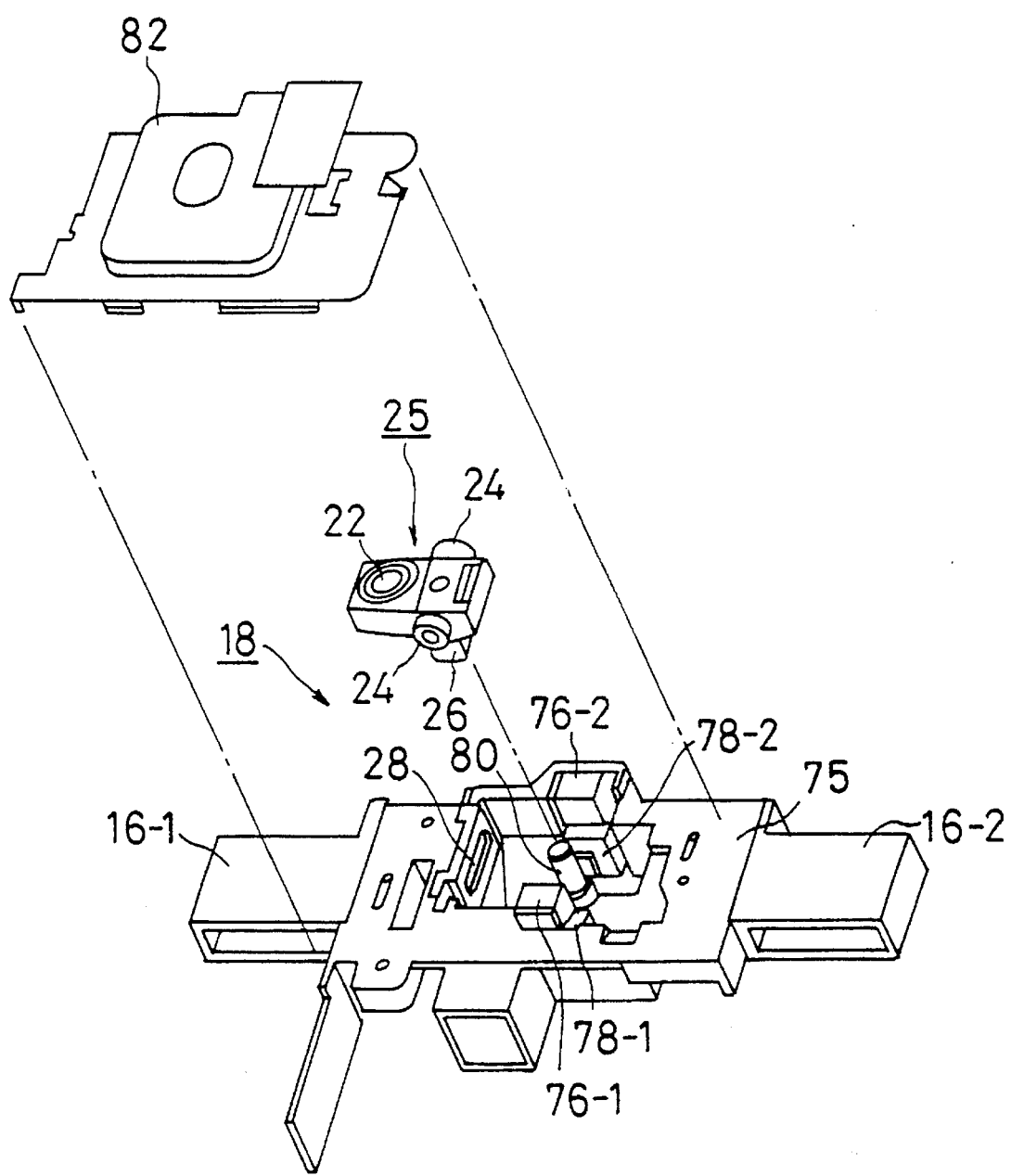
FIG. 3 is an assembly exploded diagram of the carriage and an optical head movable section.

FIG. 3 is an assembly exploded diagram of the carriage 14 and optical head movable section 18 in FIG. 2. A shaft 80 is fixed in a central rectangular dent portion of the carriage 14. The lens actuator 25 is attached to the shaft 80 by a shaft hole. The lens actuator 25 rotates around the shaft 80 and, at the same time, slides in the axial direction. The objective lens 22 is provided for the lens actuator 25. The lens actuator driving coils 24 are attached to both sides of a rotating portion of the lens actuator 25. In a state in which the lens actuator 25 is inserted to the shaft 80, a pair of magnets 76-1 and 76-2 are arranged on the outside of the lens actuator driving coils 24. Therefore, when a current is supplied to the lens actuator driving coils 24, the lens actuator 25 rotates clockwise or counterclockwise by a magnetic repulsion function between the magnets 76-1 and 76-2 on both sides. The focusing actuator driving coil 26 is provided on the lower side of the lens actuator driving coils 24 provided for the lens actuator 25. In a state in which the lens actuator 25 is attached to the shaft 80, permanent magnets 78-1 and 78-2 are arranged on both sides of the focusing actuator driving coil 26. Therefore, when a current is supplied to the focusing actuator driving coil 26, the lens actuator 25 can be vertically driven in accordance with the current direction by magnetic attraction and repulsion between the magnets 78-1 and 78-2 on both sides. By attaching a cover 82 after the lens actuator 25 was assembled to the shaft 80 of the carriage 14, the optical head movable section 18 integrated with the carriage 14 is assembled.

Figure 4:
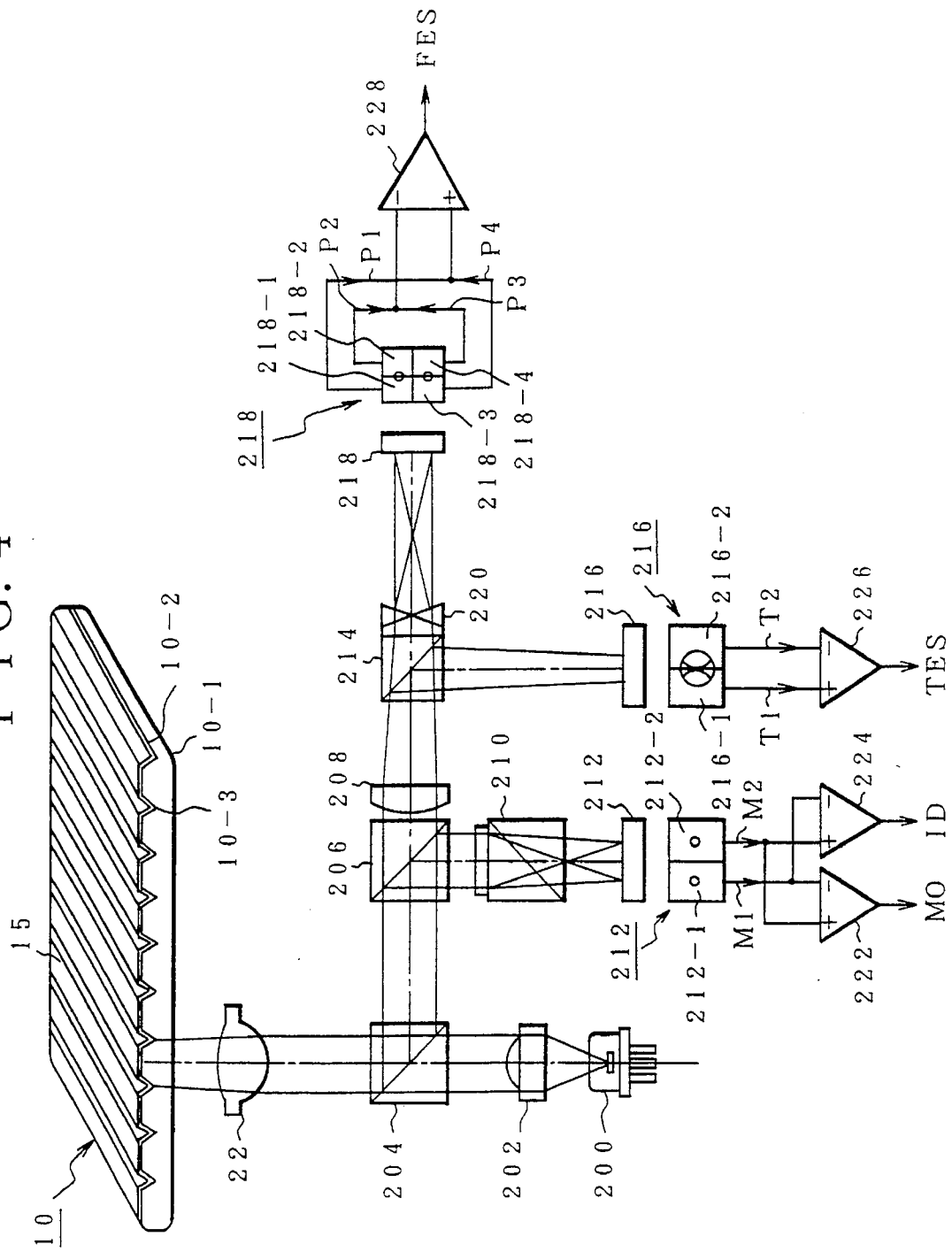
FIG. 4 is an explanatory diagram of an optical head fixing section and an optical system.

FIG. 4 shows an optical system built in the optical head fixing section 20 in FIG. 2. In this optical system, two optical systems of a going path and a return path exist. First, the going path optical system will be explained. A laser beam which is emitted from a laser diode 200 and is dispered is converted to a parallel beam by a collimator lens 202. The parallel beam transmitted through the collimator lens 202 passes through a beam splitter 204 and enters the objective lens 22. The laser beam entering the objective lens 22 is converged and a beam spot having a diameter of about 0.8 μm is formed on the disk medium 10. As is well known, the disk medium 10 is formed by coating an MO layer 10-2 onto a substrate 10-1 and a magnetization inverting pit 15 is formed by a groove 10-3 in the circumferential direction. The return path optical system will now be described. The laser beam reflected from the disk medium 10 passes along the same path of the objective lens 22 and beam splitter 204 as that of the going path in the opposite direction and is reflected by the beam splitter 204 and enters a beam splitter 206. The beam splitter 206 divides the incident laser beam to a transmission light to a detecting lens 208 and a reflection light to a Wollaston unit 210. The reflected light which entered the Wollaston unit 210 is further divided in accordance with a deflection component and enters a 2-split photodetector 212. The 2-split photodetector 212 has photosensing sections 212-1 and 212-2. Light reception signal M1 and M2 of the photosensing sections 212-1 and 212-2 are inputted to operational amplifiers 222 and 224, from which an MO signal and an ID signal are outputted. That is, M0=ID=M2−M1. The transmission light from the beam splitter 206 to the detecting lens 208 is divided by a Foucault unit 214 and enters a 2-split photodetector 216 and a 4-split photodetector 218. The 2-split photodetector 216 has photosensing sections 216-1 and 216-2 and outputs light reception signals T1 and T2. The light reception signals T1 and T2 of the photosensing sections 216-1 and 216-2 are inputted to an operational amplifier 226, from which a TES signal (TES=T1−T2) is outputted. In the Foucault unit 214, the transmission light is further divided by a cross prism 220 and enters the 4-split photodetector 218. The 4-split photodetector 218 has photosensing sections 218-1, 218-2, 218-3, and 218-4 and generates light reception signals P1 to P4. The light reception signals P1 to P4 of the photosensing sections 218-1 to 218-4 are addition inputted to an operational amplifier 228, from which an FES signal is outputted. Namely, $$FES=(P1+P3)-(P2+P4)$$

Figure 5:
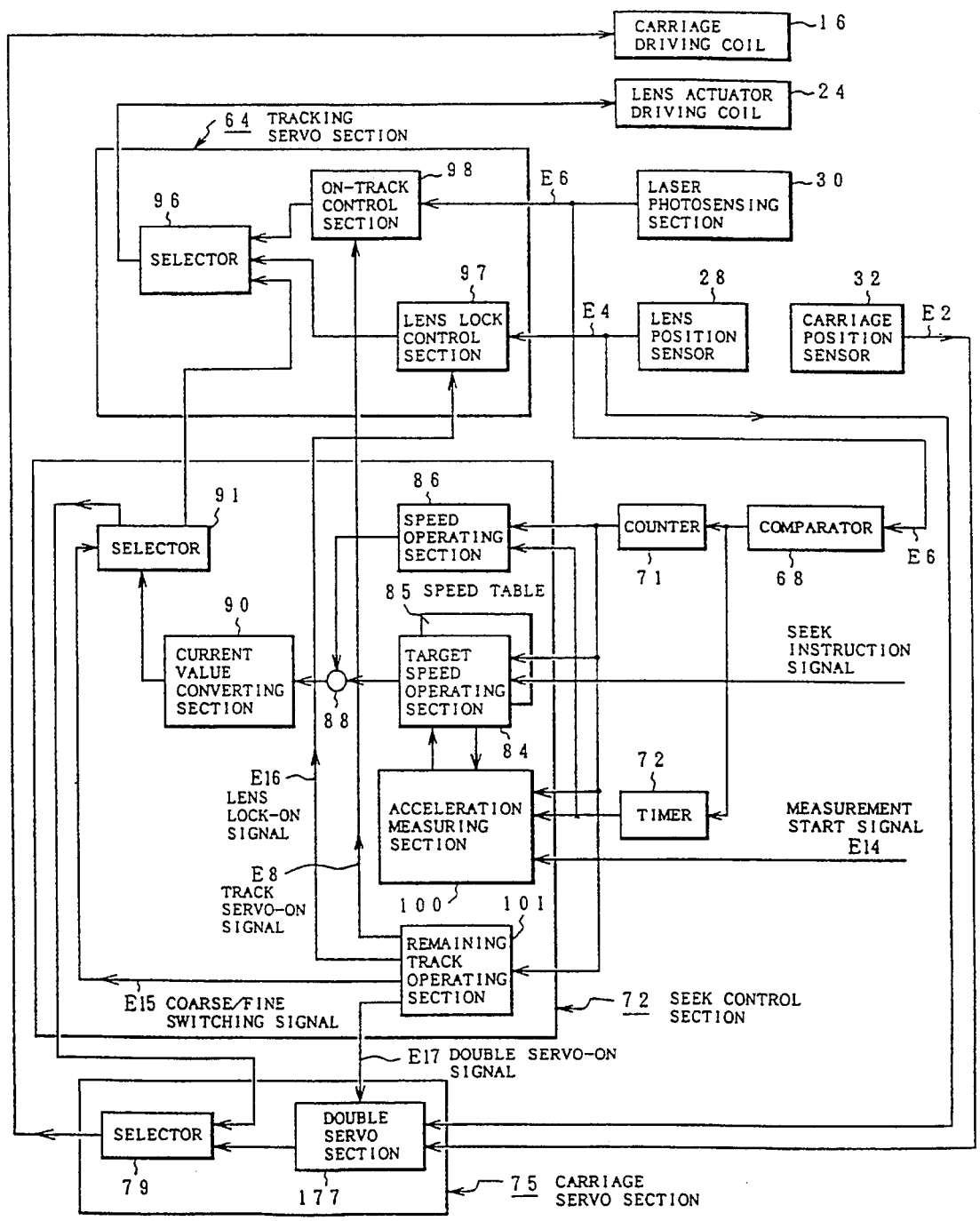
FIG. 5 is a block diagram showing functions of the invention.

FIG. 5 shows a functional block of the DSP 40 in FIG. 1 and it is constructed by the tracking servo section 64, the seek control section 72, and a carriage servo section 75. A target speed operating section 84, a speed operating section 86, and adder 88, a current value converting section 90, and a remaining track operating section 101 are provided for the seek control section 72. The speed operating section 86 receives the number of tracks through which the optical head passed within a predetermined time from the counter 71 or receives a 1-track passing time from the timer 70 and outputs a present speed signal. The target speed operating section 84 obtains the number of remaining tracks up to the target track from the number of tracks counted by the counter 71 and reads out a target speed signal corresponding to the number of remaining tracks from a table 85 which has previously been formed and outputs. The adder 88 forms a deviation signal between the present speed signal that is outputted from the speed operating section 86 and the target speed signal that is outputted from the target speed operating section 84.

An output of the current value converting section 90 is inputted to a selector 91. On the basis of a coarse/fine switching signal E15 from the remaining track operating section 101, in case of the coarse control, the output of the converting section 90 is supplied to the carriage servo section 75. When the control is shifted to the fine control, the remaining track operating section 101 switches to the output of the tracking servo section 64. For example, when the number of remaining tracks exceeds 32 tracks, the coarse switching is made effective. When it is equal to or less than 32 tracks, the fine switching is made effective. Further, in case of the coarse control, the lens lock-on signal E16 is supplied to a lens lock control section 97 of the tracking servo section 64. The lens lock-on signal E16 is reset when the control is shifted to the fine control.

The carriage servo section 75 has a double servo section 177 and a selector 79. In the coarse control, the selector 79 selects an output from the seek control section 72 and allows a current to flow to the carriage driving coil 16. When the control is switched to the fine control, a double servo-on signal E17 is generated from the remaining track number operating section 101, so that the double servo section 177 is made operative and the selector 79 selects an output of the double servo section 177. The double servo section 177 supplies the current to the carriage driving coil 16 so that the lens position of the tracking actuator 25 by the lens position sensor 28 is set to zero. An on-track control section 98, a selector 96, and the lens lock control section 97 are provided for the tracking servo section 64. The on-track control section 98 is on/off controlled by the tracking servo-on signal E8 from the seek control section 72. In the coarse control, the selector 96 selects an output of the lens lock control section 97. In the fine control, the selector 96 selects the output of the seek control section 72. Further, after completion of the seeking operation, the selector 96 selects an output of the on-track control section 98.

In addition to the functions of the seek control and on-track control in the tracking servo section 64, seek control section 72, and carriage servo section 75 as mentioned above, in the invention, an acceleration measuring section 100 is newly provided. The acceleration measuring section 100 operates when a measurement start signal is received from the MPU 120 in FIG. 1. The acceleration measuring section 100 instructs a one-track seek to the target speed operating section 84 and obtains a moving speed on the basis of the tracking error signal E6 that is obtained from the laser photosensing section 30 by the driving coil of the lens actuator by the lens actuator driving coil 24 at that time, thereby obtaining an acceleration α that is peculiar to the lens actuator from the moving speed.

A measurement of the acceleration α of the lens actuator by the acceleration measuring section 100 will now be described with reference to FIGS. 6A to 6E. It is now assumed that the acceleration measurement was started at time t1 in FIGS. 6A to 6E. Before time t1, as shown in FIG. 6D, the tracking servo ON signal E8 is in the ON state and an on-track control for tracing the beam spot to the present track is executed. When the acceleration measurement is started at time t1, the tracking servo ON signal E8 in FIG. 6A is turned off and the on-track control is cancelled. At the same time, as shown in a lens actuator driving coil current in FIG. 6B, a predetermined acceleration current is supplied for a predetermined acceleration time Tx. As shown in FIG. 6E, the acceleration time Tx is a time which is required until a moving speed (V) of the lens actuator reaches a specified target speed V0. When the speed of the lens actuator reaches the target speed (V) at time t2, the control mode is switched to the constant speed control. In a state of the constant speed control from time t2, the optical head waits until it is moved to a 0.5 track position from the tracking error signal E6 in FIG. 6A. When the head moves to the 0.5 track position, the tracking error signal in FIG. 6A is set to 0 at time t3. A time duration from the acceleration end time t2 to the arrival time t3 of the 0.5 track position is measured as a waiting time Ty. The acceleration α of the lens actuator is obtained as follows from the acceleration time Tx and waiting time Ty. First, it is now assumed that the acceleration time is equal to Tx, the time which is required until the head is moved to a half track position after the end of the acceleration is equal to Ty, a speed at that time is equal to (V), and a track pitch is equal to (C). In this case, since an area of a hatched portion that is obtained by integrating a speed change in a time interval from t1 to t3 in FIG. 6E indicates a movement distance of the half track, the following equation is satisfied.

$$\frac{1}{2} \cdot C = \frac{1}{2} \cdot Tx \cdot V + Ty \cdot V \quad (1)$$
$$= \left(\frac{1}{2} \cdot Tx + Ty\right) \cdot V \,[m]$$

From the equation (1), the speed (V) at the end of the acceleration at time t2 is obtained by the following equation.

$$V = \frac{C}{Tx + 2 \cdot Ty} \,[m/s] \quad (2)$$

Since the acceleration α denotes a gradient of a speed change in a time interval from t1 to t2, it is calculated by the following equation.

$$\alpha = \frac{V}{Tx} = \frac{C}{Tx \cdot (Tx + 2 \cdot Ty)} \quad (3)$$
$$= \frac{C}{Tx^2 + 2 \cdot Tx \cdot Ty} \,[m/s^2]$$

In the equation (3), by substituting the measurement values of the acceleration time Tx and waiting time Ty in FIGS. 6A to 6E and the well-known track pitch (C), the acceleration α can be calculated.

On the other hand, in FIGS. 6A to 6E, since the acceleration α is measured by the 1-track seek, after the head was moved to the 0.5 track position at time t2, the head waits for the same time as the waiting time Ty for t2 to t3. A current having the same magnitude as that and a polarity opposite to that upon acceleration is supplied to the lens actuator driving coil for the same deceleration time Tx as the acceleration time Tx at time t4, thereby performing the deceleration control. When the 1-seek is completed at time t5, the tracking servo ON signal E8 in FIG. 6D is again turned on, thereby returning the control mode to the on-track control. The acceleration of the lens actuator measured as mentioned above is stored and held in the acceleration measuring section 100 and the deceleration is executed.

Figure 8:
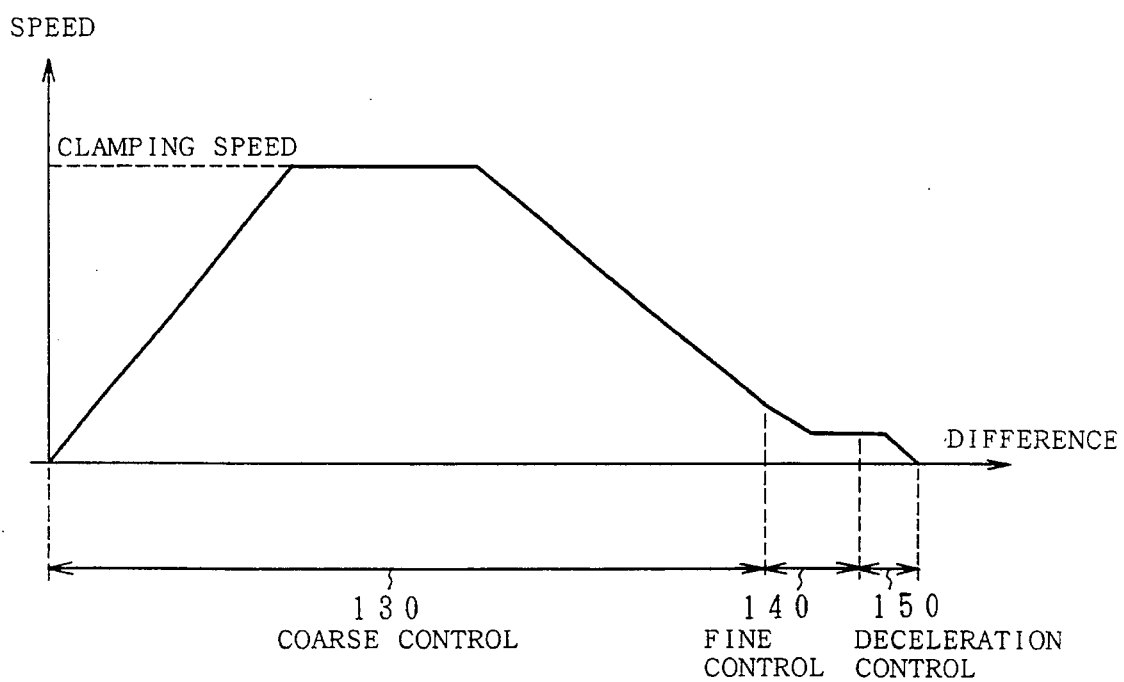
FIG. 8 is a timing chart showing a coarse control, a fine control, and a deceleration control in a seek control of the invention.
Figure 9:
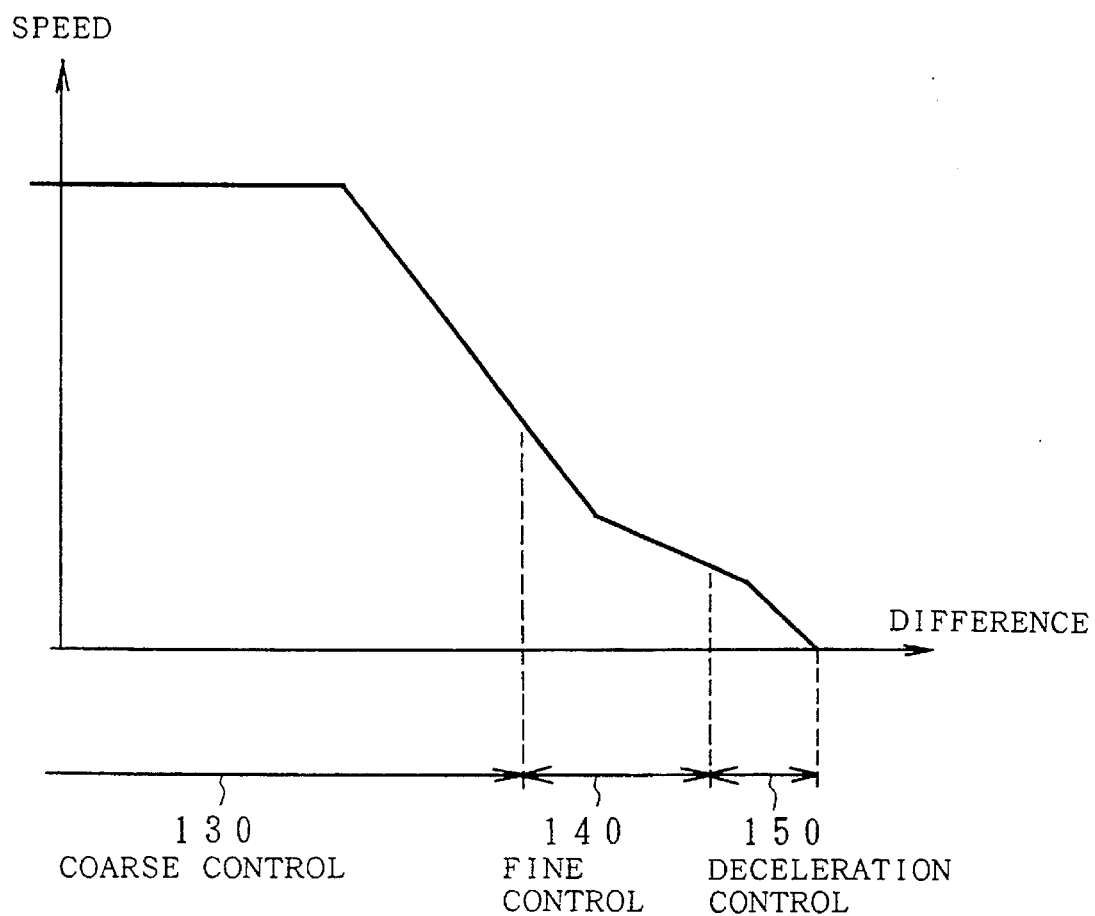
FIG. 9 is a timing chart showing a deceleration state in a shift portion from the fine control to the deceleration control of the invention.

Timing charts of FIGS. 7A to 7E relate to the deceleration control using the measurement acceleration α of the lens actuator measured by the acceleration measuring section 100. As shown in FIG. 9, the deceleration control corresponds to the portion obtained by magnifying the portion of a deceleration control 150 which is executed after a fine control 140 was performed subsequent to a coarse control 130. FIG. 8 shows the shifting portion from the fine control 140 to the deceleration control on the assumption that the speed is constant for simplicity of explanation. However, as shown in FIG. 9, there is also a case where the control is shifted while decelerating due to an inertia force.

First, like a tracking error signal E6 in FIG. 7A, the passing time (T) of one track is measured at time t1 when the number of remaining tracks for the target track is equal to the value corresponding to the position which is located by 2.5 cylinders before the target track. As shown in time t1–t2 in FIG. 7E, since an area obtained by integrating the constant speed (V) by the 1-track passing time (T) coincides with the 1-track pitch (C), the moving speed (V) at that time is obtained by the following equation.

$$V = C/T [m/s] \qquad (4)$$

A braking time TB which is necessary to set the speed to 0 by the arrival at the target track position at which the number of remaining tracks is equal to 0 at time t4 can be obtained by $$\beta = V/\alpha [s] \qquad (5)$$

on the basis of the acceleration α which has previously been measured in the timing chart of FIG. 6.

When the braking time TB for the ideal deceleration is obtained as mentioned above, a waiting time TW from the measurement end point of the 1-track passing time at time t2 to the start time t3 of the deceleration at time t3 is obtained.

Since the area of the hatched portion of the lens actuator speed in FIG. 7E at time t2–t4 coincides with the movement distance 1.5C, the following relation is satisfied.

$$V \cdot Tw + \frac{1}{2} \cdot V \cdot T_B = 1.5C \ [m] \qquad (6)$$

By summarizing the equation (6) with respect to the waiting time TW, the following equation is obtained.

$$\begin{aligned} Tw &= \frac{1}{V} \cdot \left( 1.5C - \frac{1}{2} \cdot V \cdot TB \right) \\ &= \frac{1}{2} \cdot \left( \frac{3C}{V} - TB \right) \\ &= \frac{1}{2} \cdot (3T - TB) \ [s] \end{aligned} \qquad (7)$$

As will be obviously understood from the equation (7), when the measurement time (T) of the 1-track passage of time t1–t2 and the braking time TB from the equations (4) and (5) are obtained, by substituting them, the waiting time TW can be obtained. The equation (7) is obtained just after time t2 at which the measuring time T of the 1-track passing time is obtained. When the time reaches the calculated waiting time TW by the time start from time t2, the deceleration control is started at time t3. At a time point when the deceleration control is performed for the calculated braking time TB, by returning the tracking servo ON signal E9 in FIG. 7(D) to the ON state, the servo pull-in to the ideal target track is realized.

Figure 10:
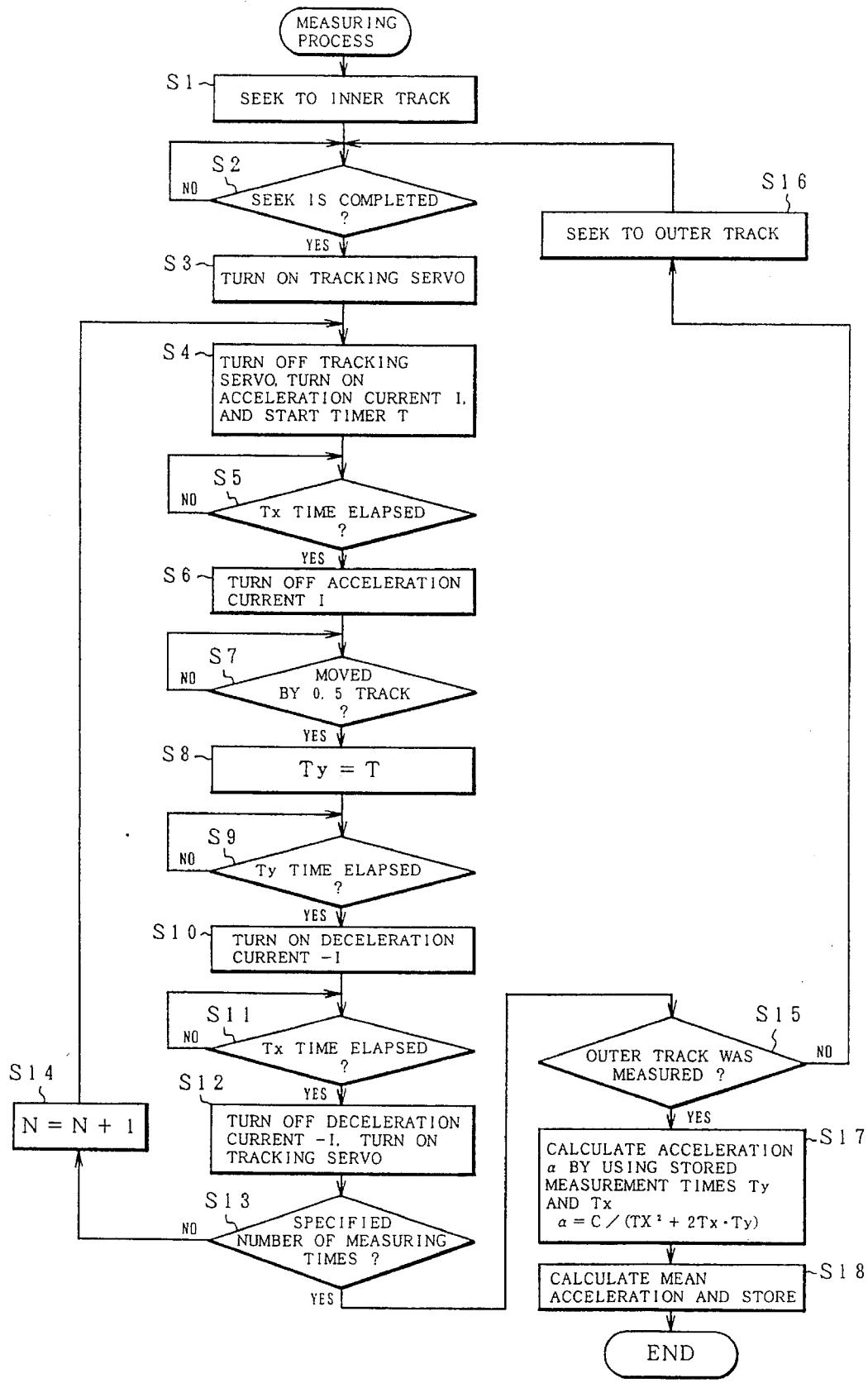
FIG. 10 is a flowchart for an acceleration measuring process of the invention.

A flowchart of FIG. 10 relates to an acceleration measuring process of the lens actuator by the acceleration measuring section 100 in FIG. 5. The embodiment is characterized in that the acceleration measurement is executed a plurality of number of times in a state in which the optical head movable section 18 was sought to a predetermined inner track of the optical disk 10, for example, to an innermost track, the acceleration measurement is subsequently executed a plurality of number of times in a state in which the optical head movable section 18 was sought to a predetermined outer track of the disk medium, for example, to an outermost track, and finally, an average value of all of the acceleration measurement values is obtained as a final result.

In FIG. 10, first in step S1, the optical head movable section 18 is sought to a predetermined inner track of the optical disk 10. When the completion of the seek is judged in step S2, the tracking servo is turned on and the tracking control is executed in step S3. In step S4, the acceleration measurement is started, the tracking servo is turned off, and an acceleration current (I) is turned on. In step S5, a check is made to see if the specified acceleration time Tx has passed or not. When the acceleration time Tx elapses, step S6 follows and the acceleration current (I) is turned off and the waiting process is executed. In step S7, a check is made to see if the head has been moved to the 0.5 track position during the constant speed control or not. If YES, step S8 follows and a value of a timer (T) at that time is set to the waiting time Ty. In step S9, a check is made to see if the same time as the waiting time Ty has passed or not. If YES, a deceleration current –I is turned on and the deceleration is started in step S10. In step S11, a check is made to see if the time Tx has passed during the deceleration or not. If YES, step S12 follows and the deceleration current –I is turned off and, at the same time, by turning on the tracking servo, the control mode is switched to the on-track control and the 1-track seek for the acceleration measurement is finished. In step S13, a check is made to see if the number of measuring times has reached a specified number or not. If NO, a count value of a counter (N) is increased by "1" in step S14. The acceleration measurement from step S4 is again repeated.

In the acceleration measurement in the inner track, the direction of the 1-track seek is switched every measurement and the acceleration α is measured until the number of measuring times reaches the specified number by the switching of the 1-track seek between the two adjacent inner tracks. In step S13, when the specified number of measuring times is obtained with respect to the inner track, step S15 follows. A check is made to see if the measurement regarding the outer track has been finished or not. If NO, the head is sought to a predetermined outer track in step S16. When the completion of the seek is judged in step S2, the measurement of a plurality of number of times in steps S13 to S14 is repeated in a manner similar to the case of the inner track. When it is judged that the number of measuring times regarding the outer track has reached the specified number in step S13, the processing routine advances from step S15 to step S17. The acceleration α is calculated from the equation (3) every number of measuring times by using the plurality of measurement times Tx and Ty stored by the measurement with respect to the inner track and outer track. In step S17, when the accelerations α can be calculated with regard to all of the measurement times, an average acceleration is finally calculated in step S10 and is stored as an acceleration α that is used for the deceleration control.

Figure 11:
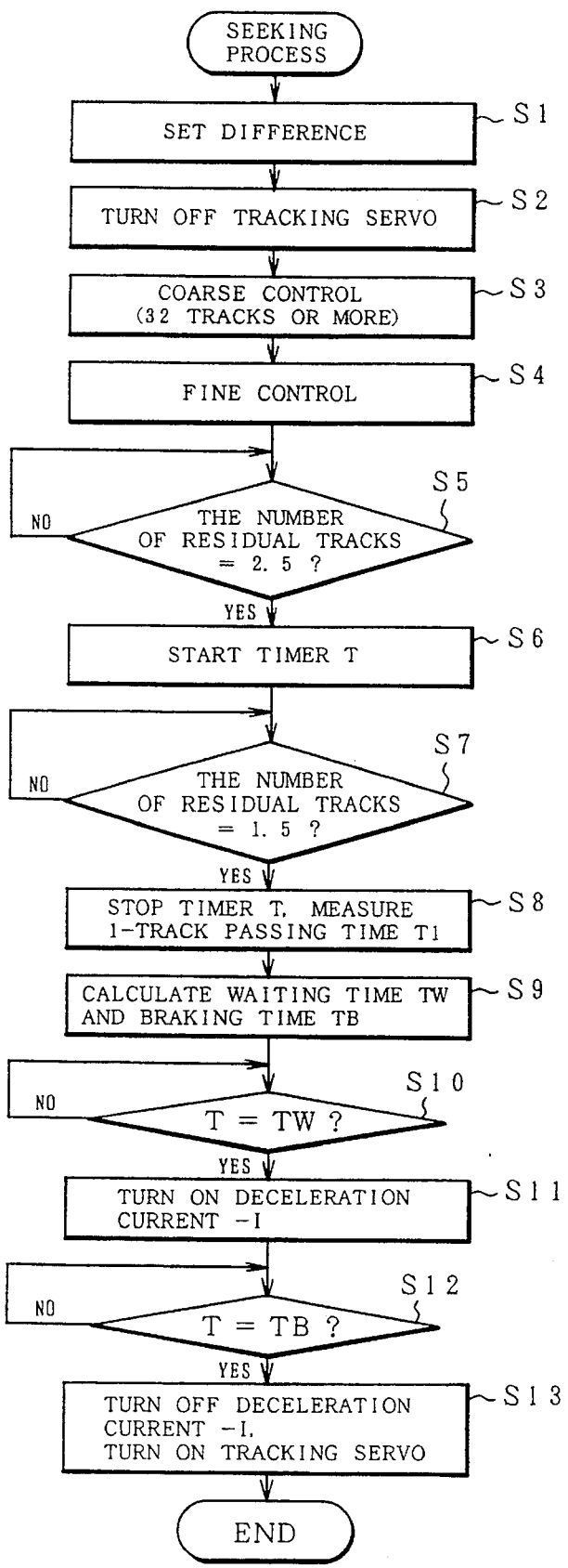
FIG. 11 is a flowchart for a seek control of the invention.

FIG. 11 is a flowchart for the seek control including the deceleration control by the seek control section 72 using the measurement acceleration α measured by the acceleration measuring section 100 in FIG. 5. First in step S1, a difference notified from an upper apparatus is set. When the difference exceeds 32 tracks, in step S2, the tracking servo is turned off. The acceleration control is executed in step S3. In step S4, the coarse control is executed. When the number of remaining tracks by the coarse control decreases to 32 tracks, the fine control is executed in step S4. During the fine control, a check is made to see if the number of remaining tracks has reached 2.5 tracks or not. If YES, the timer (T) for measurement is started in step S6. In step S7, a check is made to see if the number of remaining tracks has reached 1.5 tracks or not. If YES, the timer (T) is stopped in step S8 and the 1-track passing time (T) is set. In step S9, the measurement value of the 1-track passing time (T) is substituted to the equation (4) and the moving speed (V) is obtained. By substituting the moving speed (V) to the equation (5) and the braking time TB is calculated. Further, by substituting the braking time TB and 1-track passing time (T) to the equation (7), the waiting time TW is obtained. In step S10, a check is made to see if the time of the timer (T) started when the number of remaining tracks reaches 1.5 tracks coincides with the waiting time TW or not. If YES, the deceleration current −I is turned on and the deceleration is started in step S11. In step S12, a check is made to see if the value of the timer (T) started by the start of the deceleration coincides with the braking time TB or not. If YES, step S13 follows and the deceleration current −I is turned off and, at the same time, the tracking servo is turned on and the on-track control is executed, thereby performing the servo pull-in to the target track. The seek control is completed.

Figure 12:
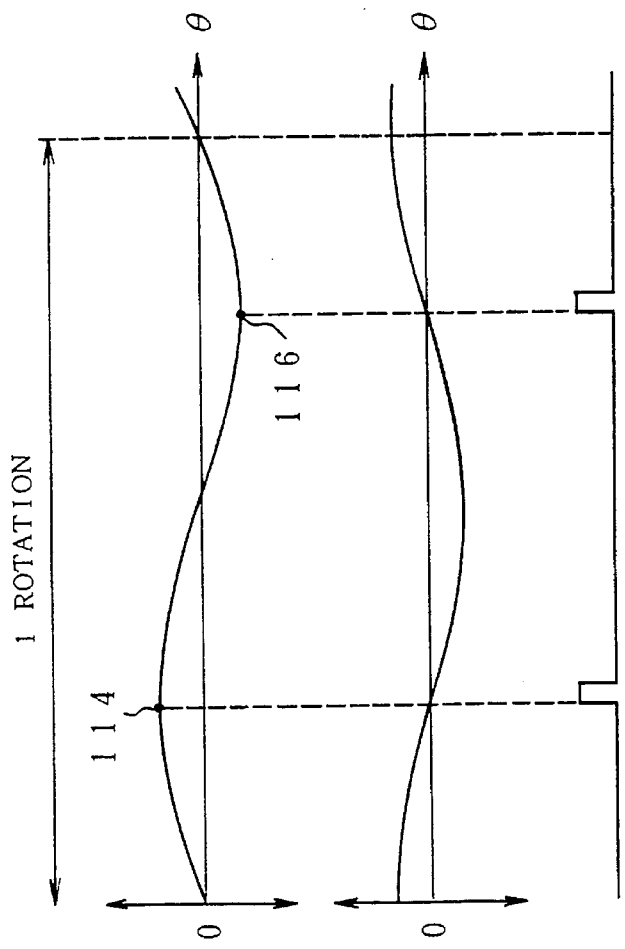
FIGS. 12A to 12C are timing charts for a medium eccentricity and acceleration measurements.

An optimum timing of the acceleration measurement for a track eccentricity of the optical disk 10 will now be described. As shown in FIG. 1, in the optical disk 10 which is attached to the spindle motor 12 and is rotated, a track position is made eccentric for the disk rotation due to a bending of the optical disk 10, a deviation for a motor rotary axis, or the like. For such a track eccentricity, the tracking servo section 64 on-track controls the lens actuator 25, so that a motion of the beam spot by the objective lens 22 which traces the track eccentricity is obtained. Such a motion of the objective lens 22 which traces the eccentricity in the on-track control is detected by the lens position sensor 28. A change in lens position signal of one rotation shown in FIG. 12A, for example, is obtained. In the acceleration measuring section 100 in FIG. 5, since the acceleration is obtained from the measurement result by the 1-track seek of the lens actuator 25, it is desirable to start the acceleration measurement at an eccentric position where the motion of the lens actuator 25 due to the track eccentricity during the on-track control is small. When seeing a lens position signal in FIG. 12A, a moving direction of the lens actuator is switched to the motion in the outer direction from the motion in the inner direction at a point 14. At this position, the moving speed in the radial direction is equal to 0. Similarly, at a point 116, the moving direction of the lens actuator has been switched from the outer direction to the inner direction. Similarly, the moving speed in the radial direction is equal to 0. Therefore, in the control of the lens actuator which traced the track eccentricity, it is desirable to start the acceleration measurement at the points 114 and 116 where there is no motion in the radial direction of the lens actuator. As for such timings of the points 114 and 116, it is sufficient to detect a zero-cross timing of a lens speed signal obtained by differentiating the lens position signal as shown in FIG. 12B and to output a measurement start signal shown in FIG. 12C. The process for the 1-track seek to measure the acceleration of the lens actuator shown in the timing chart of FIG. 6 needs only a short time of about a few hundreds of microseconds. The acceleration measurement can be repeated every timing at which the lens speed signal is equal to 0.

Figure 13:
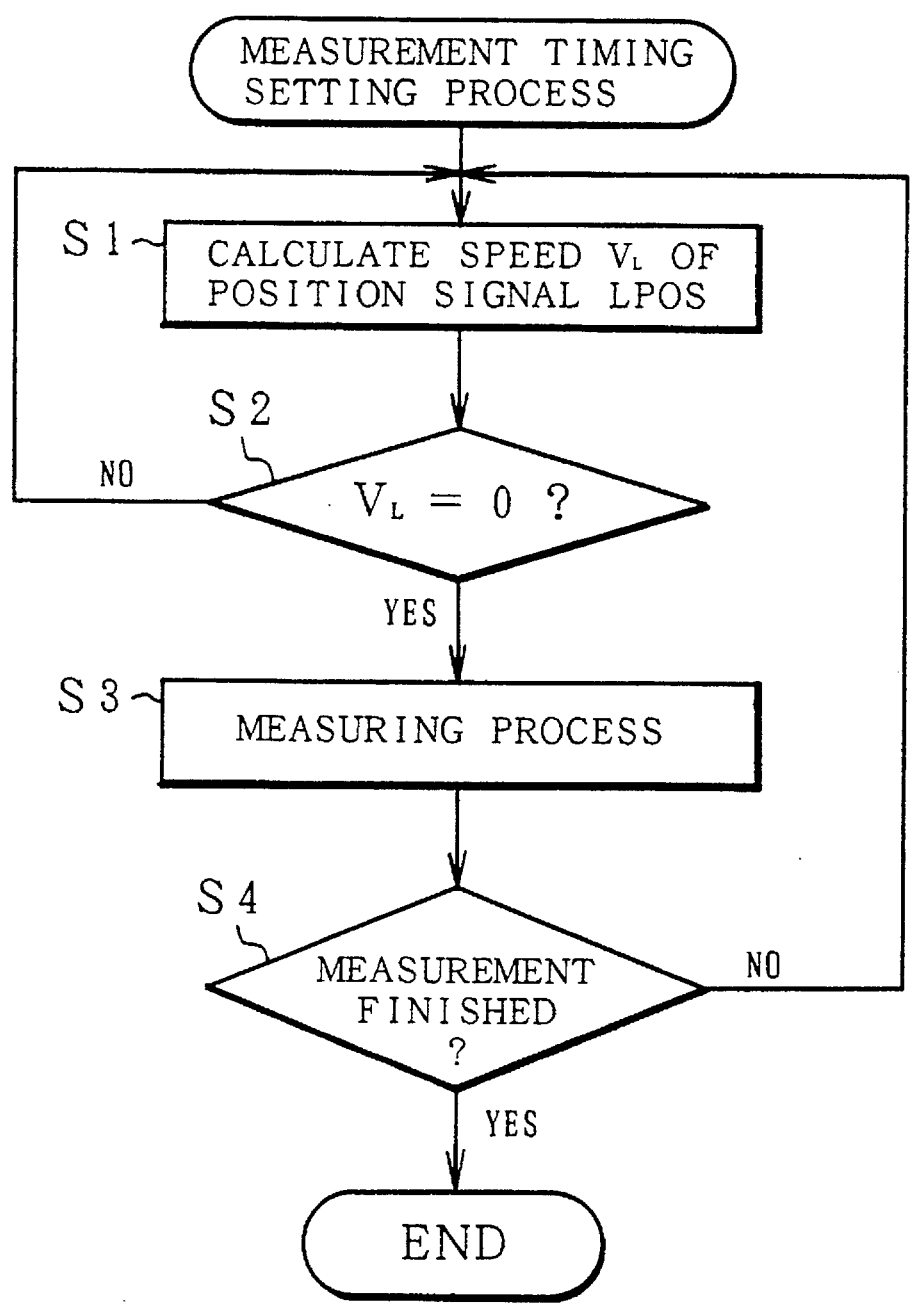
FIG. 13 is a flowchart for a setting process of a measurement timing.

A flowchart of FIG. 13 relates to a setting process of a speed measuring timing of FIGS. 12A to 12C. First in step S1, the lens position signal from the lens position sensor 28 is differentiated and a speed VL is calculated. In step S2, a check is made to see if the lens moving speed VL has reached 0 or not. If YES, a measuring process is started in step S3. When the completion of the measurement is judged in step S4, the processing routine is again returned to step S1 and the next measuring timing is set.

In the optical disk apparatus of the present invention, a time point to execute the acceleration measurement of the lens actuator by the acceleration measuring section 100 in FIG. 5 will now be described. First as shown in FIG. 1, in the optical disk apparatus of the invention, the optical disk 10 enclosed in the cartridge is inserted to the apparatus and is used. At a time point when a loading such that the optical disk 10 enclosed in the cartridge is inserted to the optical disk apparatus and is attached to the spindle motor 12 is completed, the measurement start signal E14 is supplied from the seek control section 72 to the acceleration measuring section 100 of the tracking servo section 64, thereby executing the measuring process in accordance with the flowchart of FIG. 8.

In an ordinary use state after the optical disk cartridge was loaded, when the DSP 40 in FIG. 1 is in a waiting state of a command, the measurement start signal E14 is supplied from the seek control section 72 to the acceleration measuring section 100, thereby executing the measuring process. In the measuring process in such a command waiting state, if a command is received from an upper apparatus during the measuring process, the measuring process is interrupted and the received command is preferentially processed. Further, the use time of the apparatus is counted and each time a count value reaches a predetermined use time, the acceleration measurement can be also executed. In the acceleration measurement in such a case, it is also desirable to start the measuring process when the apparatus is in the waiting state of a command from the upper apparatus in a state in which the use time of the apparatus reaches a predetermined time.

Figure 14:
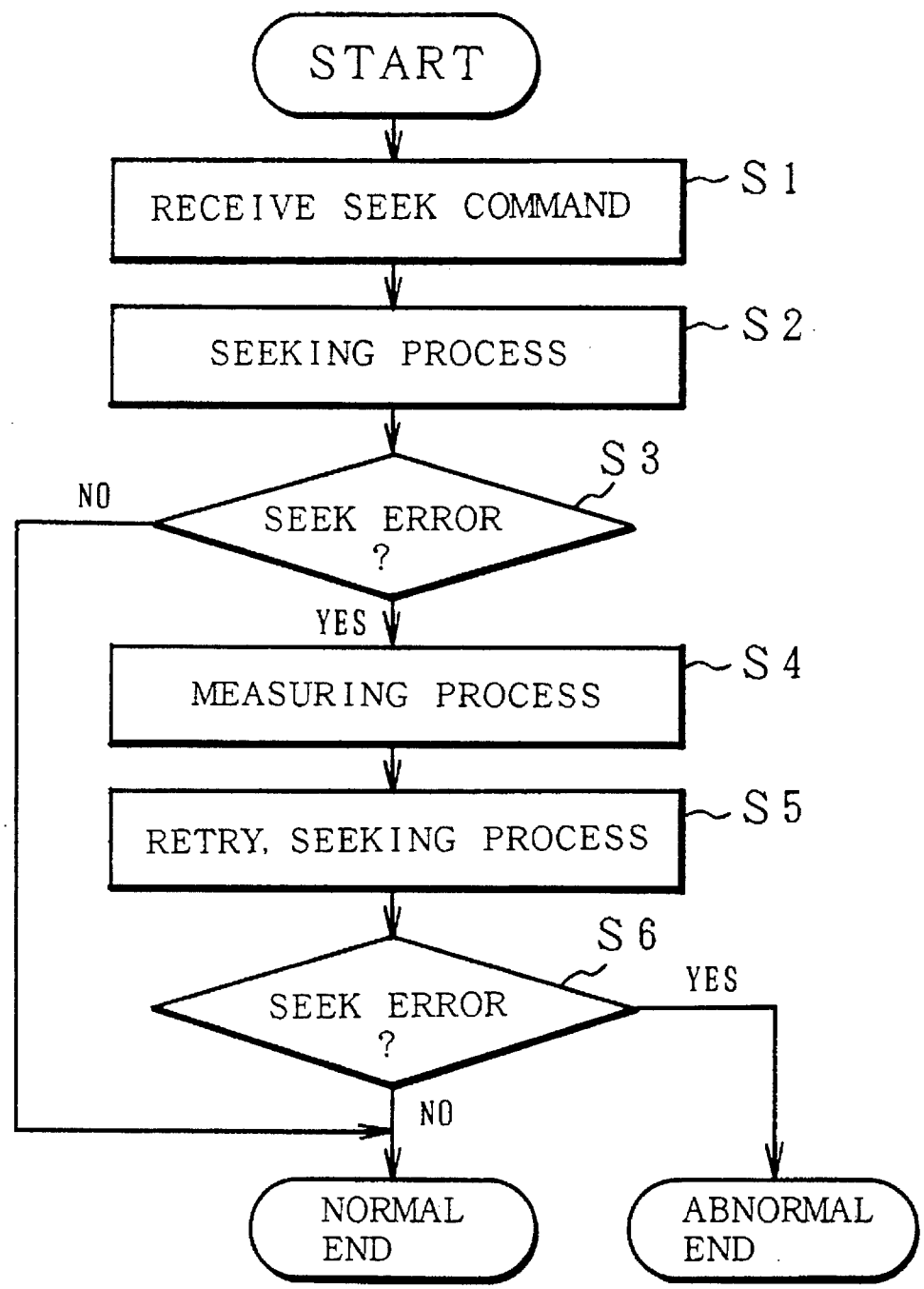
FIG. 14 is a flowchart for an acceleration measurement of the invention which is executed when a seek error occurs.

Further, in the optical disk apparatus of the invention, as shown in a flowchart of FIG. 14, when a seek error occurs by the execution of the seek command from the upper apparatus, the measuring process of the acceleration of the lens actuator is forcedly executed and a retry seek can be also performed by using a newly measured acceleration. In FIG. 14, when the seek command is received first in step S1, a seeking process is executed in step S2. With respect to such a seeking process, when the seek error occurs in step S3, step S4 follows and the measuring process of the acceleration of the lens actuator according to the flowchart of FIG. 8 is executed. When the measuring process is finished, a retry seeking process using the acceleration α obtained by the measurement is executed. If the seek error occurred by the deceleration control by the improper acceleration α, the seek error is eliminated by the deceleration control in the seek control using the proper acceleration newly measured. The processing routine can be normally finished from step S6.

According to the present invention as described above, by previously measuring the acceleration performance of the lens actuator and using the obtained acceleration for the deceleration control at the time of pull-in of the tracking servo, even if the acceleration performance of the lens actuator has a variation that is peculiar to the apparatus, the ideal deceleration control such that the speed is equal to 0 by the arrival at the target track position can be performed. The servo pull-in to the target track can be certainly executed. Since no seek error occurs, the stable seeking operation can be guaranteed, so that the seeking performance can be improved. Although the above embodiment has been shown and described with respect to the acceleration measuring process and seek control using the DSP, an MPU or an exclusive-use hardware circuit can be also used.

In the deceleration control of FIGS. 7A to 7E, the measuring process has been started when the number of remaining tracks reaches 2.5 tracks. However, it is sufficient that the position of the remaining track number at which the measurement is started is properly decided in accordance with the number of remaining tracks which are necessary for the braking time TB that is decided by the acceleration performance of the lens actuator. For example, in the case where the acceleration performance is good and the braking time TB is equal to or less than 0.5 track, it is sufficient to obtain the measurement time (T) and waiting time TW by setting the number of remaining tracks to 1.5 tracks. In the case where the acceleration performance is further lower than the timing chart of FIG. 7, the number of remaining tracks to start the measurement is set to a further large value.

In the above embodiment, further, although the average value has been obtained by executing the acceleration measurement a plurality of number of times with respect to the inner track and outer track, it is also possible to measure the acceleration a plurality of number of times with respect to the track at a proper position and to obtain the average value. Further, the invention is not limited by the numerical values shown in the embodiment.

What is claimed is:

1. An optical disk apparatus comprising:

an optical head for forming a light beam spot onto a medium surface of a disk medium by an objective lens, thereby optically reading or writing information;

a carriage on which said optical head is mounted and which is moved in a radial direction of the disk;

a lens actuator for driving said objective lens of said optical head on said carriage, thereby moving said light beam spot in the disk radial direction;

an acceleration measuring section for obtaining an acceleration that is peculiar to said lens actuator on the basis of a moving speed when said lens actuator is accelerated; and a seek control section for moving the light beam spot of said optical head toward a target track by a predetermined speed control and a constant speed control of said lens actuator, for deceleration controlling said lens actuator on the basis of said measurement acceleration when said light beam spot reaches a position which is located by a predetermined number of tracks before said target track and for on-tracking said light beam spot to the target track at an end time point of said deceleration control.

2. An apparatus according to claim 1, wherein said acceleration measuring section executes a track jump for moving the light beam spot of said optical head to an adjacent track, thereby obtaining the acceleration that is peculiar to said lens actuator.

3. An apparatus according to claim 2, wherein in said track jump in said acceleration measuring section, after the on-track control of said lens actuator was cancelled, the acceleration is executed only for a predetermined time (Tx), a control mode is switched to the constant speed control, a waiting time (Ty) until the light beam spot reaches a 0.5 track position from the end of said acceleration is measured, and further after waiting for the same time as said waiting time (Ty) from the 0.5 track position, the deceleration is performed for the same time as said acceleration time (Tx), and the control mode is switched to the on-track control.

4. An apparatus according to claim 3, wherein in the case where a track pitch is equal to (C) and the acceleration time is equal to Tx, said acceleration measuring section calculates an acceleration α that is peculiar to said lens actuator by $$\alpha = \frac{C}{Tx^2 + 2 \cdot Tx \cdot Ty}$$

on the basis of said measurement waiting time Ty.

5. An apparatus according to claim 1, wherein said acceleration measuring section executes the acceleration measurement a plurality of number of times and obtains said peculiar acceleration from an average of results of said measurement.

6. An apparatus according to claim 1, wherein said acceleration measuring section executes the acceleration measurement a plurality of number of times at a predetermined track on an inner side of said disk medium and also performs the acceleration measurement a plurality of number of times at a predetermined track on an outer side, thereby obtaining the peculiar acceleration from an average of results of said measurement of the plurality of number of times.

7. An apparatus according to claim 1, wherein said acceleration measuring section executes the acceleration measurement of said lens actuator at a turn-back position of a track eccentricity in the radial direction of said disk medium.

8. An apparatus according to claim 7, further having a lens position sensor for detecting a position of said objective lens that is driven by said lens actuator, and wherein in a state in which the light beam spot of said optical head is allowed to trace the track eccentricity in the radial direction of said disk medium by an on-track control of said lens actuator, said acceleration measuring section monitors a lens position signal from said lens position sensor and executes the acceleration measurement of said lens actuator at a position where an increasing/decreasing direction of said lens position signal changes.

9. An apparatus according to claim 8, wherein said acceleration measuring section differentiates the lens position signal which is outputted from said lens position sensor in an on-track control state of said lens actuator in which the light beam of said optical head is allowed to trace the track eccentricity in the radial direction of said disk medium and executes the acceleration measurement of said lens actuator at a position where a differentiation signal is equal to 0.

10. An apparatus according to claim 1, wherein said acceleration measuring section executes the acceleration measurement of said lens actuator when said disk medium is inserted to the apparatus.

11. An apparatus according to claim 1, wherein said acceleration measuring section executes the acceleration measurement of said lens actuator in a command waiting state from an upper apparatus.

12. An apparatus according to claim 1, wherein when a seek error occurs, said acceleration measuring section executes the acceleration measurement of said lens actuator and updates said acceleration that is used for the deceleration control of a next seek retrying operation.

13. An apparatus according to claim 1, wherein when the light beam spot reaches a position that is located by a predetermined number of tracks before a target track which is determined by an acceleration performance of said lens actuator, said seek control section measures a track passing time (T), obtains a moving speed (V), obtains a deceleration time TB to the target track by using said moving speed (V) and said measurement acceleration α, finally obtains a waiting time TW from a time point when said track measurement is finished to a start of the deceleration by said measurement time and said deceleration time TB, and deceleration controls said lens actuator for said deceleration time TB from the elapse of said waiting time TW.

14. An apparatus according to claim 13, wherein when it is assumed that a tracking passing time is equal to (T) and the deceleration time is equal to TB, said seek control section calculates said waiting time TW by $$TW = (3T - TB)/2.$$

15. A seek control method of a disk apparatus, comprising:

an acceleration measuring step of obtaining an acceleration that is peculiar to a lens actuator on the basis of a moving speed when accelerating the lens actuator for driving an objective lens of an optical head mounted on a carriage which moves in a radial direction of a disk medium, thereby moving a light beam spot on a surface of the disk medium in the disk radial direction; and a seeking step of moving the light beam spot of said optical head to a target track by a predetermined speed control and a constant speed control of said lens actuator, when said light beam spot reaches a position that is located by a predetermined number of tracks before the target track, for deceleration controlling said lens actuator on the basis of said measurement acceleration, and for on-tracking said light beam spot to the target track at an end time point of said deceleration control.

16. A method according to claim 15, wherein in said acceleration measuring step, a track jump for moving the light beam spot of said optical head to an adjacent track is executed and an acceleration that is peculiar to said lens actuator is obtained.

17. A method according to claim 16, wherein in the track jump in said acceleration measuring step, after an on-track control of said lens actuator was cancelled, the acceleration is executed for only a predetermined time (Tx) and a control mode is switched to the constant speed control, a waiting time (Ty) until the light beam spot reaches a 0.5 track position from the end of said acceleration is measured, further after waiting for the same time as said waiting time (Ty) from the 0.5 track position, the deceleration is executed for the same predetermined time as said acceleration time (Tx), and the control mode is switched to the on-track control.

18. A method according to claim 17, wherein in said acceleration measuring step, in the case where a track pitch is equal to (C) and the acceleration time is equal to Tx, an acceleration α that is peculiar to said lens actuator is calculated by $$\alpha = \frac{C}{Tx^2 + 2 \cdot Tx \cdot Ty}$$

on the basis of said measurement waiting time Ty.

19. A method according to claim 15, wherein in said acceleration measuring step, the acceleration measurement is executed a plurality of number of times and said peculiar acceleration is obtained from an average of results of said measurement.

20. A method according to claim 15, wherein in said acceleration measuring step, the acceleration measurement is executed a plurality of number of times at a predetermined track on an inner side of said disk medium, the acceleration measurement is also performed a plurality of number of times at a predetermined track on an outer side, and said peculiar acceleration is obtained from an average of the results of said measurement of said plurality of number of times.

21. A method according to claim 15, wherein in said acceleration measuring step, the acceleration measurement of said lens actuator is performed at a turn-back position of a track eccentricity in a radial direction of said disk medium.

22. A method according to claim 21, wherein in said acceleration measuring step, in a state in which the light beam spot of said optical head is allowed to trace the track eccentricity in the radial direction of said disk medium by an on-track control of said lens actuator, a lens position signal of said objective lens detected by a lens position sensor is monitored and the acceleration measurement of said lens actuator is executed at a position where an increasing/decreasing direction of said lens position signal is changed.

23. A method according to claim 22, wherein in said acceleration measuring step, in a state in which the light beam of said optical head is allowed to trace the track eccentricity in the radial direction of said disk medium by the on-track control of said lens actuator, the lens position signal detected by said lens position sensor is differentiated and the acceleration measurement of said lens actuator is executed at a position where a differentiation signal is set to 0.

24. A method according to claim 15, wherein in said acceleration measuring step, when said disk medium is inserted to the apparatus, the acceleration measurement of said lens actuator is executed.

25. A method according to claim 15, wherein in said acceleration measuring step, the acceleration measurement of said lens actuator is executed in a command waiting state from an upper apparatus.

26. A method according to claim 15, wherein in said acceleration measuring step, when a seek error occurs, the acceleration measurement of said lens actuator is executed and said acceleration that is used for the deceleration control of a next seek retrying operation is updated.

27. A method according to claim 15, wherein in said seek control step, when the light beam spot reaches a position that is located by a predetermined number of tracks before a target track which is determined by an acceleration performance of said lens actuator, a track passing time (T) is measured, a moving speed (V) is obtained, a deceleration time TB to the target track is subsequently obtained by using said moving speed (V) and said measurement acceleration α, a waiting time TW until a start of the deceleration from a time point of the end of said track measurement is finally obtained by said measurement time (T) and said deceleration time TB, and said lens actuator is deceleration controlled for said deceleration time TB from the elapse of said waiting time TW.

28. A method according to claim 27, wherein in said seek control step, in the case where a 1-track passing time is equal to (T) and the deceleration time is equal to TB, said waiting time TW is calculated by $$TW = (3T - TB)/2.$$

\* \* \* \* \*